3,394,145
N-(3,4-DICHLOROPHENYL) MALEIMIDE

Donald E. Bublitz, Concord, Calif., assignor to The Dow Chemical Company, Midland, Mich., a corporation of Delaware
No Drawing. Filed Dec. 17, 1965, Ser. No. 514,668
1 Claim. (Cl. 260—326.5)

The present invention is directed to N-(3,4-dichlorophenyl) maleimide. The compound of the present invention is a crystalline solid which melts at 170° C. The compound is of very low solubility in water and of moderate solubility in common organic solvents. This compound has been found to be useful as an antimicrobial agent for the control of various fungi and bacteria such as *Staphylococcus aureus, Candida albicans, Trichophyton mentagrophytes,* citrus green mold, *Fusarium solani phaseoli, Verticillium alboatrum* and rice blast. In addition, this compound has been found to be particularly useful for the kill and control of *Venturia inequalis,* the pathogen which causes apple scab.

The new compound of the present invention is prepared by reacting maleic anhydride with 3,4-dichloroaniline to produce the 3',4'-dichloromaleanilic acid intermediate which is subsequently dehydrated by conventional procedures to produce the N-(3,4-dichlorophenyl) maleimide. The reaction directed to the preparation of 3',4'-dichloromaleanilic acid can be carried out in the presence of an inert organic solvent such as benzene, toluene, methylene chloride, chloroform, carbon tetrachloride, or ether. The reaction takes place readily with production of the desired intermediate at a temperature of from —20° C. to the reflux temperature of the inert organic solvent and preferably at temperatures of from 10° C. to 40° C. In those cases where the reaction is conducted in the absence of an inert organic solvent it is preferred that the reaction be carried out at a temperature of from 60° C. to 120° C.

The proportions of the maleic anhydride and 3,4-dichloroaniline to be employed are not critical, some of the desired intermediate being formed upon contacting these reactants in any proportions. However, the reaction consumes the maleic anhydride and 3,4-dichloroaniline starting materials in equimolar proportions and the use of the starting materials in about such proportions is preferred.

In carrying out the production of the desired product, the maleic anhydride and 3,4-dichloroaniline are contacted together in any order or fashion. In a convenient procedure, the reactants are dispersed in an organic dispersion medium. The temperature of the reaction mixture is then maintained within the reaction temperature range for a short period of time. During the reaction period the 3',4'-dichloromaleanilic acid intermediate begins to precipitate in the reaction mixture. Following the reaction period the reaction mixture can be cooled to insure that most of the intermediate is precipitated. This intermediate is then subjected to conditions designed to split 1 molecular proportion of water from each molecular proportion of 3',4'-dichloromaleanilic acid to produce a molecular proportion of N-(3,4-dichlorophenyl) maleimide. The dehydration of the 3',4'-dichloromaleanilic acid is accomplished by contacting the aforesaid intermediate with acetic anhydride and sodium acetate and heating to a temperature of between 60° C. and 140° C. or by the use of a conventional dehydrating agent that will not add to the double bond, such as $P_2O_5$. In those cases wherein the intermediate is contacted with acetic anhydride and sodium acetate the dehydration reaction can be carried out in the presence of an inert organic solvent such as benzene, toluene, methylene chloride, chloroform, carbon tetrachloride or ether. The reaction is carried out at a temperature from 60–120° C. with the production of the desired product. The desired N-(3,4-dichlorophenyl) maleimide product is isolated by such conventional procedures as diluting the dehydration mixture with water in order to precipitate the desired product, the latter thereafter being collected by filtration or decantation. In another representative procedure, the reaction mixture can be distilled to remove the low boiling constituents and obtain the N-(3,4-dichlorophenyl) maleimide product as a residue. This product can be further purified by such procedures as washing with water or recrystallization from an organic solvent.

In carrying out the preparation of the compound of the present invention, it has been found to be unnecessary to isolate the 3',4'-dichloromaleanilic acid intermediate. This intermediate can be dehydrated in the reaction mixture in which it was originally formed by the addition of acetic anhydride and sodium acetate to the reaction mixture following the production of the desired intermediate or by heating the reaction mixture to a temperature of from 60° C. to 120° C. or by exposing the reaction mixture to a dehydrating agent, such as $P_2O_5$. The desired N-(3,4-dichlorophenyl) maleimide product is then separated from the reaction mixture as previously described. In still further operations, it has been found that the acetic anhydride and sodium acetate can be combined with the maleic anhydride and 3,4-dichloroaniline in order that the dehydration of the 3',4'-dichloromaleic acid takes place in situ as rapidly as the latter is formed. The desired product is then separated from the reaction mixture as previously described.

The compound of the present invention is useful as an antimicrobial agent for the control of many bacterial and fungal pests. For such use the unmodified compound can be used. Alternatively, the compound can be dispersed on an inert finely divided solid and the resulting preparation employed as a dust. Also, such preparations can be dispersed in water with or without the aid of a wetting agent and the resulting aqueous dispersion employed as sprays. In other procedures the compound can be employed in a solvent or as a constituent in a solvent-in-water or water-in-solvent emulsion or as an aqueous dispersion thereof which can be applied as a spray, drench or wash.

The compounds of the present invention or compositions containing the same, can be applied to fungi and bacteria and their habitats and food in parasiticidal amounts to obtain excellent control and kills of many organisms. The compounds can be employed in the soil to kill and control fungi and bacteria found in the soil.

The compound conveniently can be employed in liquid or dust compositions. In such usage, the compound is modified with one or a plurality of adjuvants or helpers including water, organic solvents, petroleum oils, petroleum distillates, naphthas or other liquid carriers, surface-active dispersing agents and finely divided solids such as chalk, talc or bentonite. Depending upon the concentration of the parasiticide compound in such formulations, the augmented compositions are adapted to be distributed on plant or plant parts, or in soil, or to be employed as concentrates and subsequently diluted with additional liquid or solid adjuvants to produce the ultimate treating compositions.

The exact concentration of the novel compounds to be employed in the treating compositions is not critical and may vary considerably provided a bactericidal or fungicidal amount of effective agent is supplied on the plant or plant part or in the soil. The concentration of toxicant in liquid compositions generally is from about 5 to 50 percent by weight. Concentrations up to 95 percent by weight oftentimes are conveniently employed in concentrates. In dusts, the concentration of the toxicant can be from about 1 to 10 percent by weight. In compositions to be employed as concentrates, the toxicant can be present in a concentration of from 5 to 98 percent by weight.

In addition, other liquid compositions containing the desired amount of effective agent can be prepared by dissolving the toxicant in an organic liquid such as acetone, methylene chloride, chlorobenzene and petroleum distillates. The preferred organic solvent carriers are those which are adapted to accomplish the penetration and impregnation of the pest environment and particularly soil with the toxicant compounds and are of such volatility as to leave little permanent residue thereon. Particularly desirable carriers are the petroleum distillates boiling almost entirely under 400° F. at atmospheric pressure and having a flash point above 80° F.

The following examples are merely illustrative and are not intended to be limiting.

Example 1

3,4-dichloroaniline (48.6 grams; 0.3 mole) was dissolved in 500 milliliters of ether and the resulting solution added slowly with stirring to a solution of of maleic anhydride (29.4 grams; 0.3 mole) dissolved in 500 milliliters of ether. During the contacting of the reactants and for about 45 minutes thereafter, the reaction mixture was heated at the boiling temperature and under reflux. Following the heating period, the reaction mixture was cooled. During the reaction the 3',4'-dichloromaleanilic acid product precipitated in the reaction mixture as a crystalline solid. This solid was removed from the reaction mixture by filtration.

The 3',4'-dichloromaleanilic acid obtained by filtration was suspended in a mixture of 11 grams of sodium acetate in 120 milliliters of acetic anhydride. The resulting mixture was heated at 100° C. for one hour. Following the heating period, the reaction mixture was cooled and thereafter diluted with two liters of water. During the dilution, the N-(3,4-dichlorophenyl)maleimide product precipitated in the reaction mixture and was removed therefrom by filtration. The product was thereafter dried and found to melt at 170° C. Combustion analysis established that the compound had carbon, hydrogen, and cholorine contents of 49.92, 1.89 and 29.08 percent, respectively, as compared to the theoretical contents of 49.61, 2.08 and 29.29 percent, respectively.

Example 2

Twenty-five parts by weight of N-(3,4-dichlorophenyl) maleimide is mixed and ground with 27 parts diatomaceous earth (Celite 209), 42 parts of Barden clay (a kaolinite clay) 3 parts of a non-ionic surface active agent (nonylphenol condensed with 9–10 moles of ethylene oxide), and 3 parts of a substituted benzenoid alkyl sulfonic acid (Daxad No. 27) to prepare a concentrate composition in the form of a wettable powder. A portion of this composition is dispersed in water to produce an aqueous spray composition containing ¼–4 pounds of toxicant per 100 gallons of ultimate mixture. This composition is applied to trees of an apple orchard for the control of apple scab (*Venturia inaequalis*). In the treating operations, applications of the spray composition are made at about weekly intervals over a period of 9 weeks duration, the first application being made at the pre-pink stage of bloom of the trees. Unsprayed check trees are maintained in the orchard to provide for a continuous source of reinfestation. One week following the last spray application, the trees are examined and compared with the untreated check trees to determine what control of apple scab is obtained. The examination establishes that the foilage and fruit on the trees treated with the N-(3,4-dichlorophenyl) maleimide are substantially free of the lesions of apple scab. At the time of the observations, the untreated check trees are found to support a heavy infestation of apple scab.

Example 3

Forty-five parts by weight of N-(3,4-dichlorophenyl) maleimide is mixed and ground with 5 parts by weight of Triton–155 to prepare a water-dispersible concentrate composition containing 90 percent by weight of the N-(3,4-dichlorophenyl) maleimide.

In a further operation, 25 parts by weight of N-(3,4-dichlorophenyl) maleimide and 10 parts by weight of Triton -155 and 65 parts by weight of xylene are mixed together to prepare an emulsifiable concentrate composition containing 25 percent by weight of the maleimide compound.

In a similar manner, 25 parts by weight of N-(3,4-dichlorophenyl) maleimide and 71 parts of fuller's earth, 2 parts of alkyl aryl sulfonate (Nacconol NR) and 2 parts of a polymerized sodium salt of a substituted benzoid alkyl sulfonic acid (Daxad No. 27) are mechanically mixed and ground together to prepare a concentrate in the form of a wettable powder and containing 25 percent by weight of the N-(3,4-dichlorophenyl) maleimide compound.

A mixture of 20 parts by weight N-(3,4-dichlorophenyl) maleimide, 0.1 part of Nacconol NR, 0.1 part Daxad No. 27, and 100 parts of water are ball-milled together to prepare a water-dispersible liquid concentrate composition containing 20 parts by weight of the maleimide compound. The concentrate composition thus prepared can be dispersed in water to prepare aqueous compositions which have very desirable wetting and penetrating properties and are adapted to distribute microbicidal amounts of the N-(3,4-dichlorophenyl) maleimide on plants and plant parts.

Example 4

In further representative operations aqueous compositions containing N-(3,4-dichlorophenyl) maleimide at concentrations of 500 parts per million by weight give complete kills or inhibition of growth of *Salmonella typhosa, Staphylococcus aureus, Candida albicans, Trichopyton metagrophytes,* citrus green mold, *Fusarium solani phaseoli, Verticillium alboatrum,* rice blast, and fire blight.

I claim:
1. N-(3,4-dichlorophenyl) maleimide.

OTHER REFERENCES

J. Van Overbeek Chemical Abstracts, vol. 49, page 7798F (1955).

NICHOLAS S. RIZZO, *Primary Examiner.*

J. TOVAR, *Assistant Examiner.*